(12) United States Patent
Curtis, Jr. et al.

(10) Patent No.: US 7,422,267 B2
(45) Date of Patent: Sep. 9, 2008

(54) VEHICLE ENCLOSURE

(75) Inventors: Fred Curtis, Jr., Princeton, MA (US); Gary Orrell, Milbury, MA (US)

(73) Assignee: Curtis Industries LLC, Worcester, MA (US)

( * ) Notice: Subject to any disclaimer, the term of this patent is extended or adjusted under 35 U.S.C. 154(b) by 133 days.

(21) Appl. No.: 11/103,933

(22) Filed: Apr. 12, 2005

(65) Prior Publication Data

US 2006/0087145 A1 Apr. 27, 2006

Related U.S. Application Data

(63) Continuation-in-part of application No. 11/053,574, filed on Feb. 8, 2005, and a continuation-in-part of application No. 10/974,451, filed on Oct. 27, 2004.

(51) Int. Cl.
*B60J 15/06* (2006.01)
(52) U.S. Cl. ............... 296/146.12; 296/202; 49/246; 280/DIG. 5
(58) Field of Classification Search ............ 296/146.12, 296/202; 49/246; 280/DIG. 5
See application file for complete search history.

(56) References Cited

U.S. PATENT DOCUMENTS

| | | | |
|---|---|---|---|
| 2,460,399 A | 2/1949 | Schassberger | 296/148 |
| 2,682,427 A | 6/1954 | Bright | 296/148 |
| 3,387,406 A | 6/1968 | Coker et al. | 296/50 |
| 3,454,299 A | 7/1969 | Hewitt et al. | 296/50 |
| 3,567,274 A | 3/1971 | Kaptur et al. | 296/50 |
| 3,592,504 A | 7/1971 | Sandor | 296/70 |
| 3,623,764 A | 11/1971 | Jacobus | 296/50 |
| 3,747,273 A | 7/1973 | Johnson | 49/394 |
| 4,076,301 A | 2/1978 | Gergoe | 296/57.1 |
| 4,133,574 A | 1/1979 | Martin | 296/28 |
| 4,299,058 A | 11/1981 | Spaulding | 49/386 |
| 4,335,911 A | 6/1982 | Taylor | 292/262 |
| 4,372,603 A | 2/1983 | Stanczak et al. | 296/146.12 |
| 4,437,410 A | 3/1984 | Stoller et al. | 105/378 |
| 4,621,859 A | 11/1986 | Spicher | 296/78 R |
| 4,773,694 A | 9/1988 | Gerber | 296/77.1 |
| 4,929,004 A | 5/1990 | Chidester | 292/267 |
| 4,932,714 A | 6/1990 | Chance | 296/148 |
| 5,004,286 A | 4/1991 | Taylor et al. | 296/24.46 |
| 5,203,601 A | 4/1993 | Guillot | 296/77.1 |
| 5,217,275 A | 6/1993 | Ridge | 296/77.1 |

(Continued)

OTHER PUBLICATIONS

United Kingdom communication dated Aug. 17, 2007.

*Primary Examiner*—Joseph D Pape
(74) *Attorney, Agent, or Firm*—Nields & Lemack

(57) ABSTRACT

Method of controlling the climate in a recreational vehicle with an accessory door assembly such as for a golf cart, method of mounting a door assembly, and method of golfing. The door assembly includes a doorframe that can be secured to the vehicle, and a preferably rigid door that is easily mountable and demountable, and is movable between an open and closed position. The door can be secured to the vehicle in the open position so that the passengers have the option of riding in the vehicle while the door remains open. A hinge system minimizes the clearance necessary to open and close the door, and provides an optional assist feature that helps urge or bias the door to the open or closed position and maintain it there.

15 Claims, 16 Drawing Sheets

U.S. PATENT DOCUMENTS

| | | | |
|---|---|---|---|
| 5,259,656 A | 11/1993 | Carroll | 296/77.1 |
| 5,276,745 A | 1/1994 | Revelli, Jr. | 385/14 |
| 5,310,235 A | 5/1994 | Seymour et al. | 296/77.1 |
| 5,388,881 A | 2/1995 | Spencer et al. | 296/77.1 |
| 5,393,118 A | 2/1995 | Welborn | 296/147 |
| 5,404,618 A | 4/1995 | Heiler et al. | 16/261 |
| 5,429,404 A | 7/1995 | King, Sr. et al. | 296/79 |
| D363,265 S | 10/1995 | Althoff | D12/16 |
| 5,529,369 A | 6/1996 | Welborn | 296/77.1 |
| 5,544,449 A | 8/1996 | Amelio et al. | 49/383 |
| 5,588,690 A | 12/1996 | Showalter | 296/77.1 |
| 5,632,065 A | 5/1997 | Siladke et al. | 16/335 |
| 5,685,594 A | 11/1997 | Harper | 296/51 |
| D413,283 S | 8/1999 | Stepp et al. | D12/16 |
| 6,030,024 A | 2/2000 | Schmidhuber et al. | 296/146.12 |
| 6,158,801 A | 12/2000 | Tucker | 296/146.1 |
| 6,161,336 A | 12/2000 | Ziv-Av | 49/260 |
| 6,213,535 B1 | 4/2001 | Landmesser et al. | 296/146.12 |
| 6,276,745 B1 | 8/2001 | Wilson | 296/155 |
| 6,293,610 B1 | 9/2001 | Howard | 296/148 |
| 6,382,705 B1 | 5/2002 | Lang et al. | 296/155 |
| 6,412,877 B1 | 7/2002 | Faison | 296/183.2 |
| 6,439,637 B1 | 8/2002 | Tyrer | 296/79 |
| 6,547,304 B1 | 4/2003 | Conner et al. | 296/79 |
| 6,658,803 B2 | 12/2003 | Szyjkowski | 52/213 |
| 6,742,826 B2 | 6/2004 | Humphrey et al. | 296/51 |
| 6,748,776 B2 | 6/2004 | Bullock et al. | 70/212 |
| 6,764,130 B1 | 7/2004 | Hull | 296/186.4 |
| 6,773,055 B1 | 8/2004 | Stoudt et al. | 296/153 |
| 6,776,445 B1 | 8/2004 | Conner et al. | 296/79 |
| 6,779,825 B1 | 8/2004 | Greenert et al. | 296/51 |
| D498,436 S | 11/2004 | Bonner et al. | D12/16 |
| D498,704 S | 11/2004 | Bonner et al. | D12/16 |
| 6,827,390 B2 | 12/2004 | Zummallen et al. | 296/146.11 |
| 6,942,277 B2 | 9/2005 | Rangnekar et al. | 296/146.11 |
| D515,458 S | 2/2006 | Tolfsen et al. | D12/85 |
| 6,997,504 B1 | 2/2006 | Lang et al. | 296/146.12 |
| 7,070,225 B2 | 7/2006 | Herrmann | 296/146.6 |
| 7,080,868 B2 | 7/2006 | McClure et al. | 296/146.11 |
| 7,096,538 B2 | 8/2006 | Liang et al. | 296/146.11 |
| 7,147,257 B2 | 12/2006 | Johansen et al. | 292/341.15 |
| 7,150,486 B2 | 12/2006 | Ichinose | 296/51 |
| 7,165,800 B2 | 1/2007 | Thiele et al. | 296/57.1 |
| 2005/0110298 A1 | 5/2005 | Fin et al. | 296/146.5 |
| 2005/0127712 A1 | 6/2005 | Castillo | 296/146.12 |
| 2006/0087145 A1 | 4/2006 | Curtis et al. | 296/80 |
| 2006/0087149 A1 | 4/2006 | Curtis et al. | 296/146.1 |
| 2006/0087150 A1 | 4/2006 | Curtis et al. | 296/146.1 |

VEHICLE ENCLOSURE

This application is a continuation-in-part of co-pending application Ser. No. 11/053,574 filed Feb. 8, 2005, and a continuation-in-part of co-pending Ser. No. 10/974,451 filed Oct. 27, 2004.

BACKGROUND OF THE INVENTION

Enclosures for vehicles, including battery powered or gas powered vehicles such as recreational vehicles, golf carts, neighborhood electric vehicles (NEV'S, which can be street-legal) and utility vehicles to protect the occupants from inclement weather, are well known. In general, conventional golf cart enclosures utilize relatively flimsy fabric material, which can be draped over the golf cart and/or golf cart roof and secured in place such as with zippers, VELCRO or other fastening means. In addition to being unattractive, such enclosures suffer from various drawbacks, including difficulty in obtaining ingress and egress from the cart, soiling of the fabric, lack of durability of the fabric and/or the fastening means, a requirement that the doors remain closed during operation of the cart, unattractiveness, etc.

For example, U.S. Pat. No. 6,158,801 to Tucker discloses a golf cart enclosure that encloses the rear of the cart as well as both sides of the occupants' compartment or cabin. The side enclosures utilize a top and bottom parallel channel system, with wheels that are guided in the channels to move the door open and shut. The door includes a plurality of vertical aluminum bars that support a vinyl panel.

U.S. Pat. No. 6,293,610 to Howard discloses a door system for a golf cart-like street legal vehicle. A pair of hinged doors is removable from framework on each side of the vehicle. The framework is permanently mounted to existing structure on the vehicle.

U.S. Pat. No. 4,932,714 to Chance discloses a demountable door for a golf cart. The door includes a panel of clear plastic that is linked to the cart and is movable to allow access to the cart.

None of the foregoing embodiments provides an aesthetically pleasing, durable, weather resistant, easy to operate, readily removable door system for vehicles such as golf carts. In addition, none provides a door assembly where the door can be stored in the open position in an aesthetically pleasing manner and without risk of it unexpectedly and/or undesirably slamming shut during movement or sudden stopping of the vehicle.

SUMMARY OF THE INVENTION

The problems of the prior art have been overcome by the present invention, which provides an accessory door assembly for the normally open sides of a vehicle such as a recreational vehicle, NEV, utility vehicle, or golf cart. The door assembly includes a doorframe that can be secured to the vehicle, and a preferably rigid door that is easily mountable and demountable, and is movable between an open position allowing ingress and egress from the vehicle, and a closed position. The door can be secured to the vehicle in the open position so that the passengers have the option of riding in the vehicle while the door remains open. Preferably the door is contoured to match the contour of the vehicle, so that even when the door is stored in the open position, the vehicle remains aesthetically pleasing. A unique hinge system is utilized that minimizes the clearance necessary to open and close the door, and provides an optional assist feature that helps urge or bias the door to the open or closed position and maintain it there. The hinges are virtually hidden from view when viewed from the exterior of the vehicle, and are completely hidden when so viewed when the door is in the closed position. The door assembly remains aerodynamic and aesthetically pleasing whether in the open or closed position. Minimal modification of the vehicle is necessary to install the door.

The door assembly enables effective climate control within the vehicle. The control of climate can be enhanced by the inclusion of a heating and/or cooling system within the vehicle enclosure.

Also provided is a method of golfing, wherein a golfer enters the passenger compartment of a golf cart, closes the aforementioned door, drives the golf cart to a desired location on a golf course, such as the location of the golfer's golf ball, opens the door, exits the golf cart, optionally closes the door, strikes the ball, returns to the golf cart, and optionally closes the door.

DETAILED DESCRIPTION OF THE INVENTION

Figure 1:
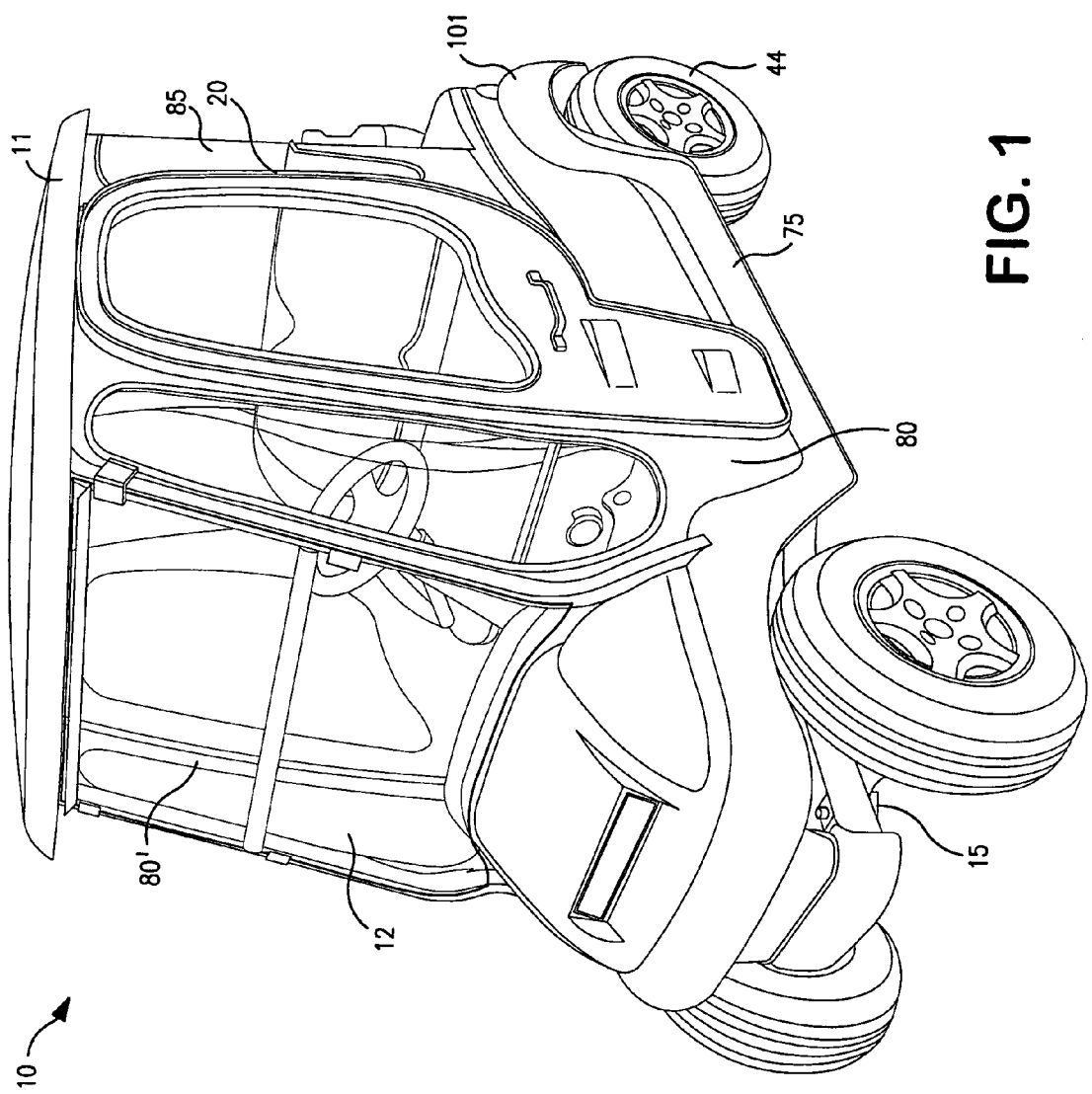
FIG. 1 is a perspective view of a golf cart including the door assembly of a first embodiment of the present invention.
Figure 2:
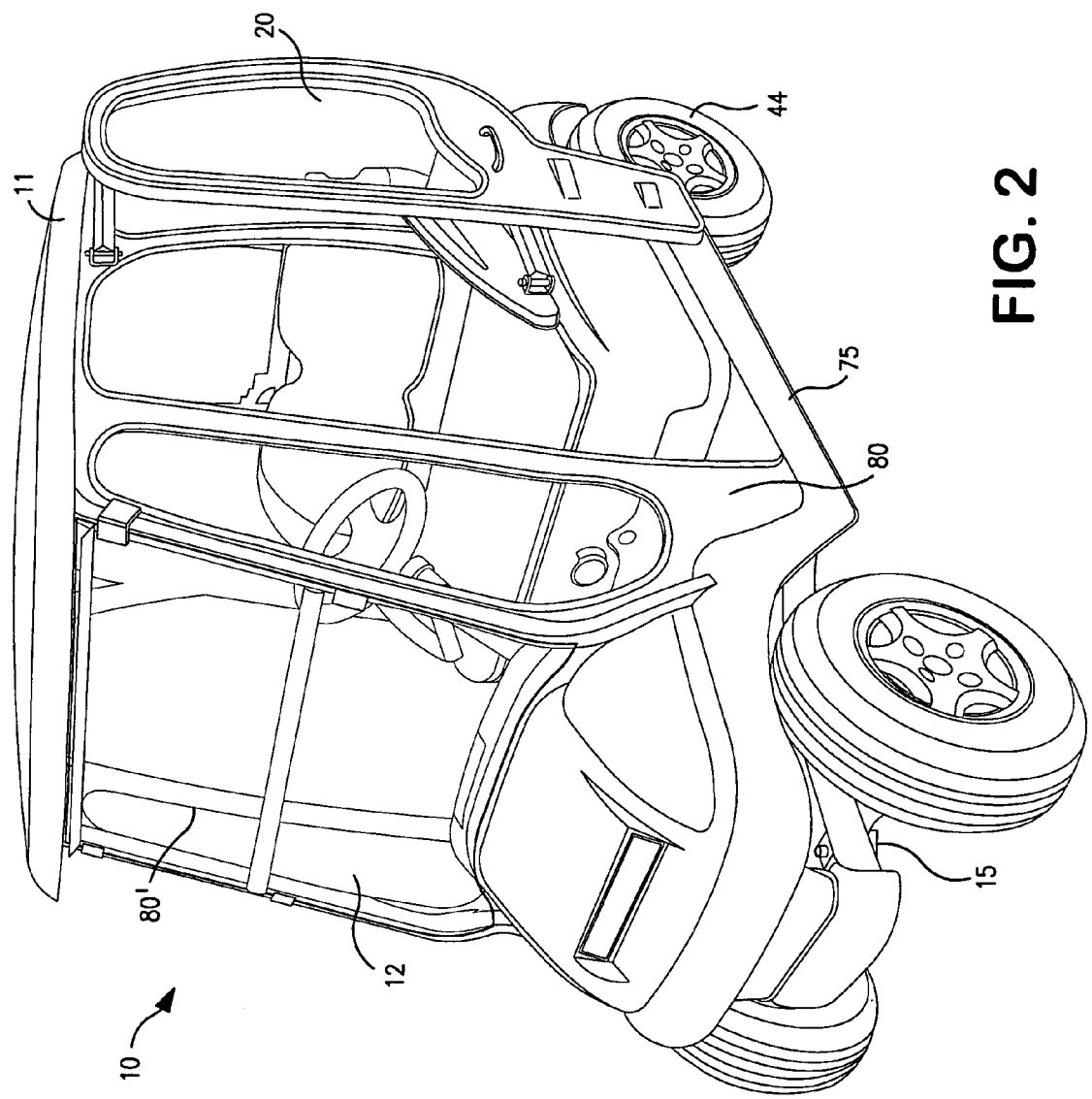
FIG. 2 is a perspective view of the golf cart of FIG. 1 with the door in the open position.

Turning first to FIG. 1, there is shown at 10 a vehicle such as a golf cart suitable for use with the present invention. Although not to be construed as limiting, the door assembly of the present invention can be used with golf carts manufactured by Club Car, EZ-GO and Yamaha, with preferably little or no modification to the vehicle itself. Those skilled in the art will also appreciate that the door assembly of the invention is not limited to use on a golf cart; the door assembly also can be used on vehicles such as recreational vehicles, NEV's, utility vehicles and other off-road vehicles, although for ease of illustration, golf carts will be exemplified herein. In general, the vehicle 10 has front and rear wheels, a chassis 15, on which is built a normally open passenger compartment (with suitable seating, generally for two passengers), an existing roof 11 having suitable supports, and a windshield 12, as shown. Those skilled in the art will appreciate that the roof 11 and windshield 12 can be original equipment or added in the aftermarket. A pair of doors 20 in accordance with the present invention is shown in the closed position on opposite sides of the vehicle 10. The door assemblies are shown stored in the open position in FIG. 2. In the closed position, the doors close the access opening to the passenger compartment defined in part by the vehicle chassis, the roof and the windshield.

Figure 1A:
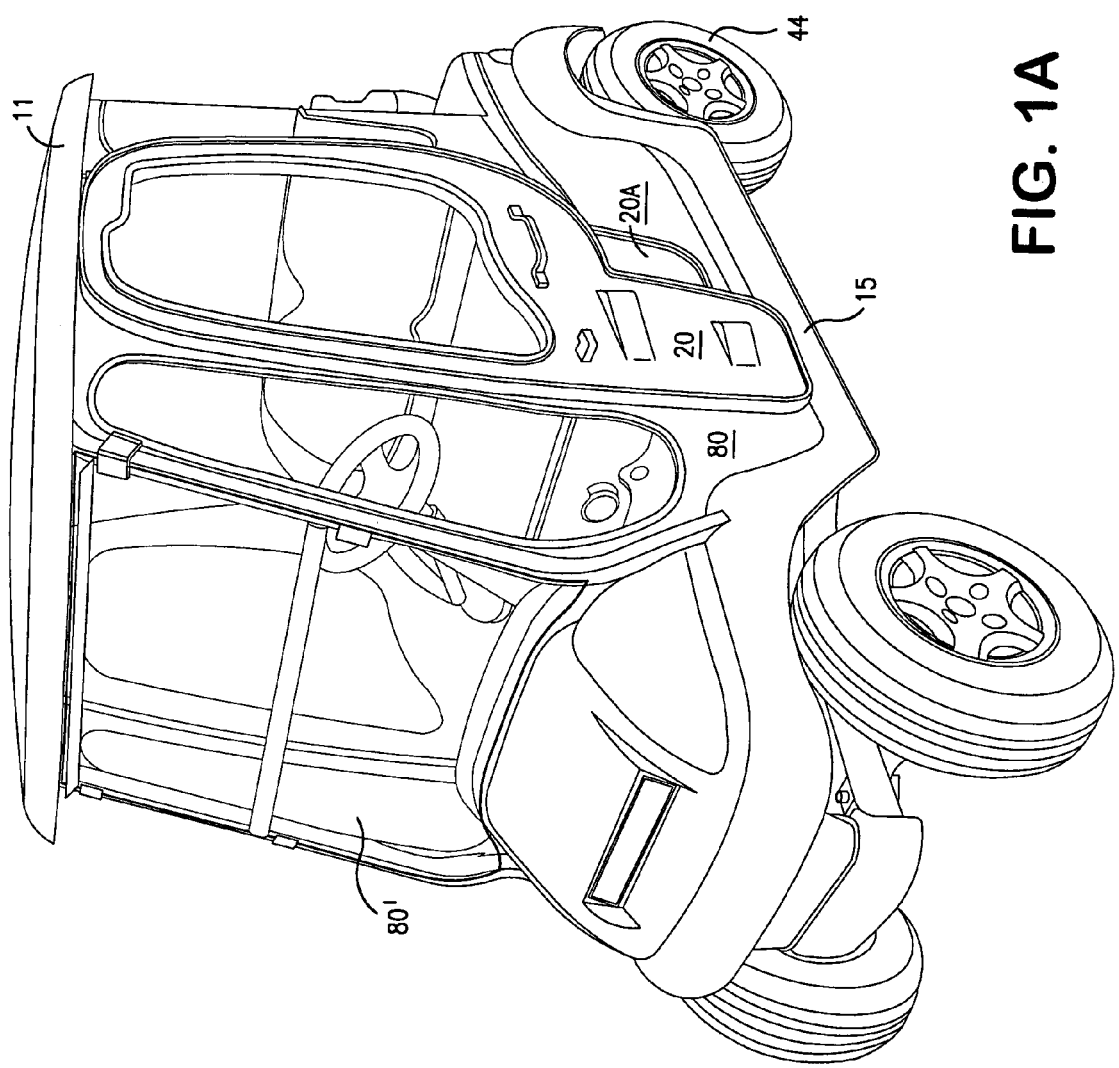
FIG. 1A is a perspective view of a golf cart including the door assembly of a second embodiment of the present invention.
Figure 1B:
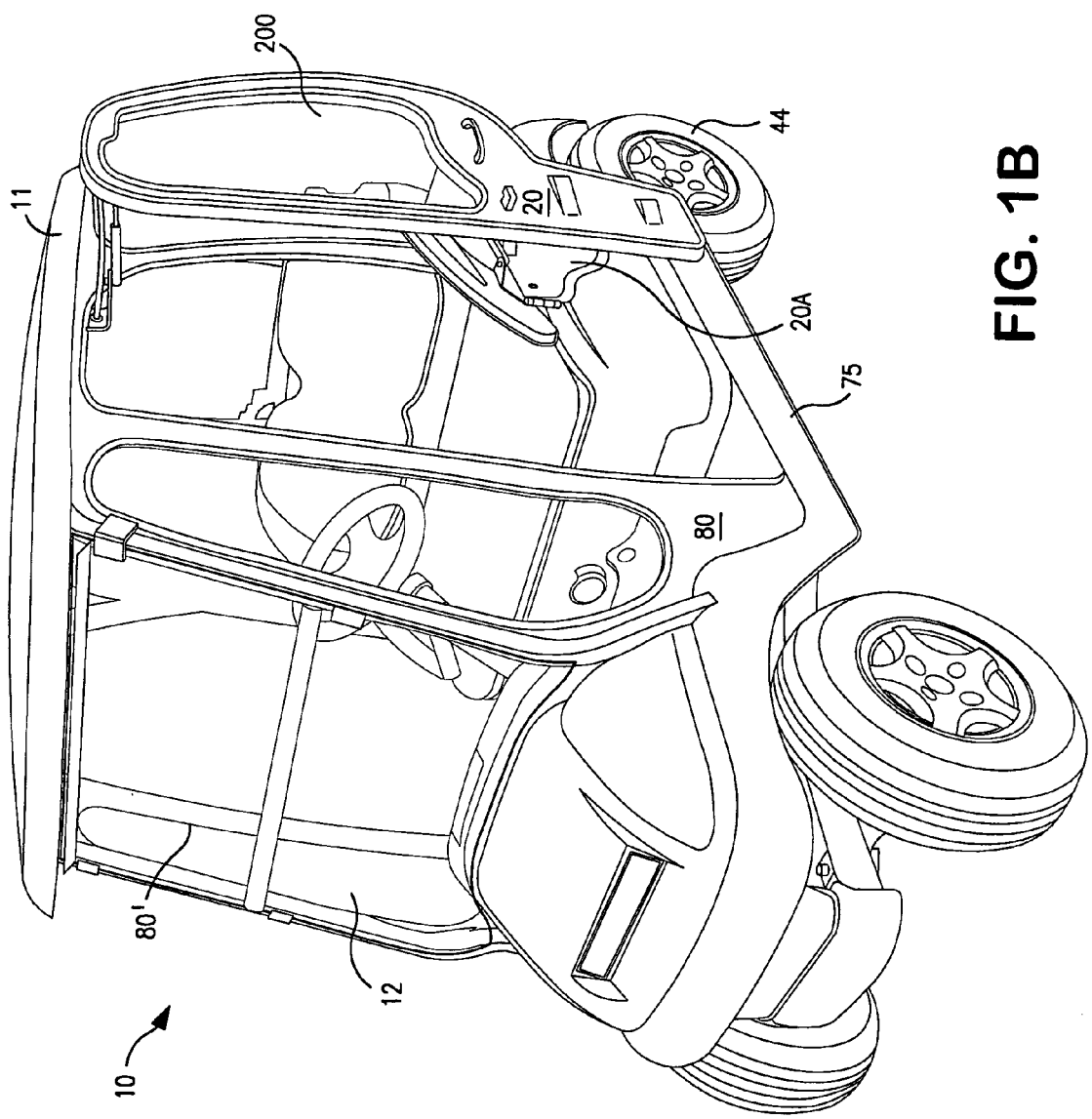
FIG. 1B is a perspective view of the golf cart of FIG. 1A with the door in the open position.

FIG. 1A illustrates an alternative embodiment that includes an auxiliary door panel 20A to close the gap that may be present with the door 20 in the closed position. The gap is created as a result of the curved contour of the lower right or rearward portion of the door 20, the curved contour allowing the rear wheel to remain exposed (when viewed from the side of the vehicle) even when the door is in the open position, thereby maintaining an aesthetically pleasing design as discussed in greater detail below. As seen in FIG. 1B, preferably the auxiliary panel 20A is secured to the hinge member, so that as the door 20 is opened, the auxiliary panel 20A swings with the hinge, remains near the passenger compartment (but is now facing in the opposite direction), and therefore does not block the rear wheel.

Figure 3:
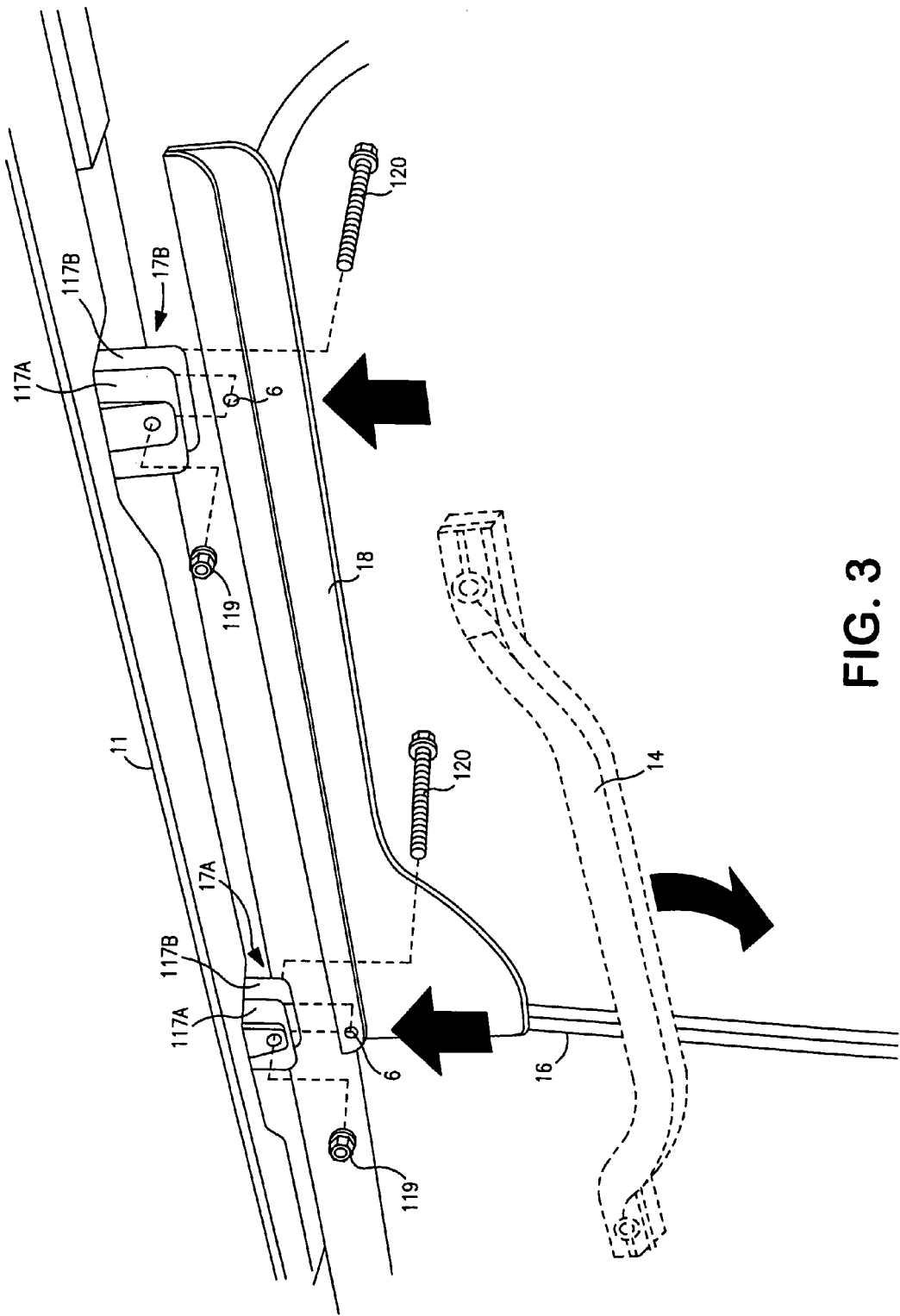
FIG. 3 is a perspective view of the top of the door frame showing the location of its attachment to the vehicle roof.

Preferably the door assembly of the present invention is attached to the vehicle with minimal modification to the vehicle itself, utilizing existing structure. To that end, as best seen in FIG. 3, the door frame 16 can be affixed to the underside of the existing roof 11 using existing brackets 17A, 17B. These brackets, each of which includes a pair of spaced flanges 117A, 117B are intended to support handle 14, shown in dotted lines in FIG. 3. The handle is removed, and doorframe bracket 18 is inserted in the spaces between flanges 117A and 117B and is secured to the brackets 17A, 17B by any suitable means, such as with respective nuts 119 and bolts 120 as shown by the dotted lines in FIG. 3. In the event the brackets 17A, 17B are not present in a particular vehicle, the doorframe can be affixed directly to the roof, or to suitable roof extensions or brackets that can be added. The doorframe bracket 18 preferably includes spaced holes that align with respective corresponding holes in the brackets 17A, 17B as shown.

Figure 4:
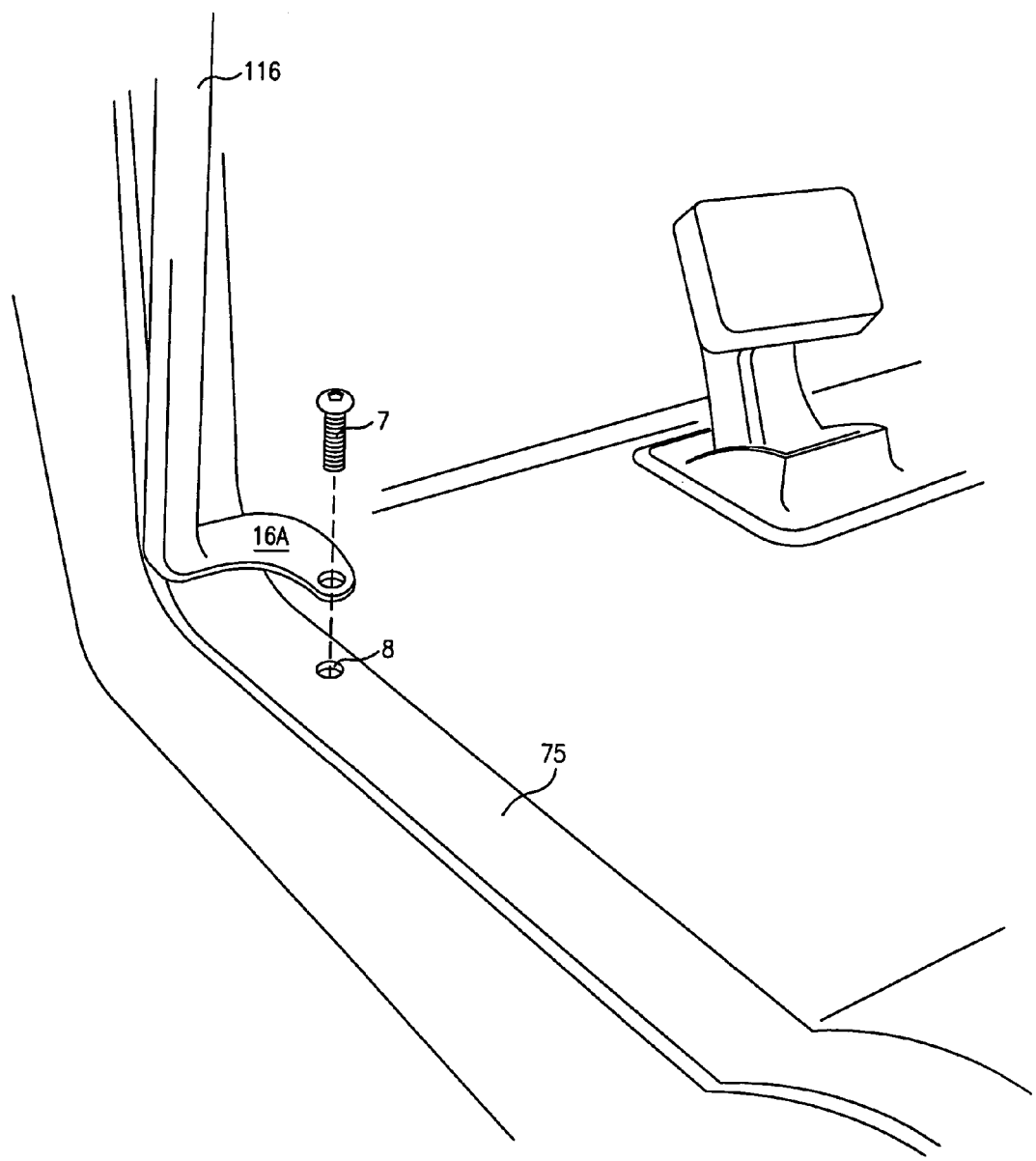
FIG. 4 is a perspective view of the bottom of the door frame showing the location of its attachment to the vehicle.
Figure 5:
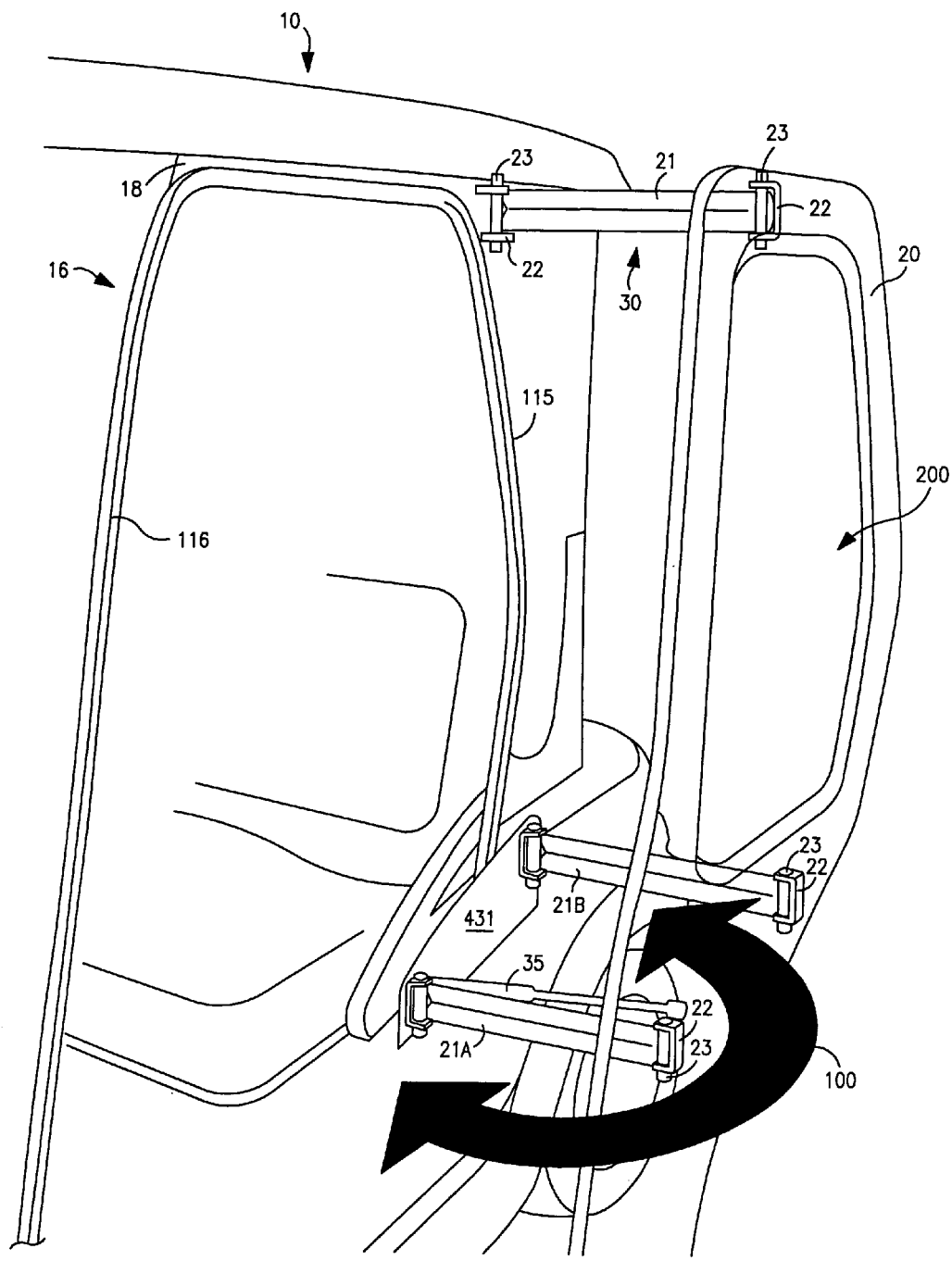
FIG. 5 is a perspective view of the door shown attached to the vehicle by an upper hinge system and a lower hinge assembly.

As best seen in FIG. 4, doorframe 16 includes an elongated member 116 that extends downwardly from the bracket 18 and terminates in a free foot end 16A that is secured to the vehicle bumper 75, such as by bolt 7. The elongated member 116 can be affixed to the bracket 18 by any suitable means, such as welding. A suitable hole 8 can be drilled in the bumper 75 for securing the free foot end 16A thereto. As seen in FIG. 5, The doorframe 16 also includes a second elongated member 115 that is spaced from the first elongated member 116 and extends downwardly from the bracket 18, and is secured to plate 431 preferably near the passenger seating area such as by welding. The second elongated member 115 can be affixed to the bracket 18 by any suitable means, such as by welding. In the preferred embodiment, the doorframe 16 is a continuous bent piece, and is preferably made of a rigid material, capable of withstanding repeated contact from the door itself. Suitable materials of construction include steel, preferably tubular for increased support, metal, aluminum and plastic, with steel being preferred. Although the doorframe 16 is intended to be permanently mounted to the vehicle and become an integral part thereof (since it does not interfere with a user entering or exiting the vehicle, nor does it interfere with the operation or storage of the vehicle), it can be readily removed if desired. The doorframe defines a doorway which can be blocked by closing door 20, as discussed in greater detail below.

Door 20 is designed to fit within the doorframe 16 when the door is in the closed position, blocking ingress into and egress from the passenger compartment, and preferably closing in a weather-tight manner. The environment within the compartment defined with the doors closed can be controlled. Preferably the door 20 (and auxiliary door panel 20A) is made of a sturdy, durable, rigid material that can withstand harsh environmental conditions, golf ball impact, and protect the passengers from weather. Suitable materials of construction include metal, stainless steel, aluminum and preferably plastic such as a polyolefin, including polyethylene and/or polypropylene. Preferably the door includes molded plastic supported about its perimeter by a tubular steel framework, and includes a transparent or translucent window portion 200 to permit the passengers viewing access to the exterior of the vehicle. The window portion 200 can be formed of acrylic, polycarbonate or glass.

Figure 6:
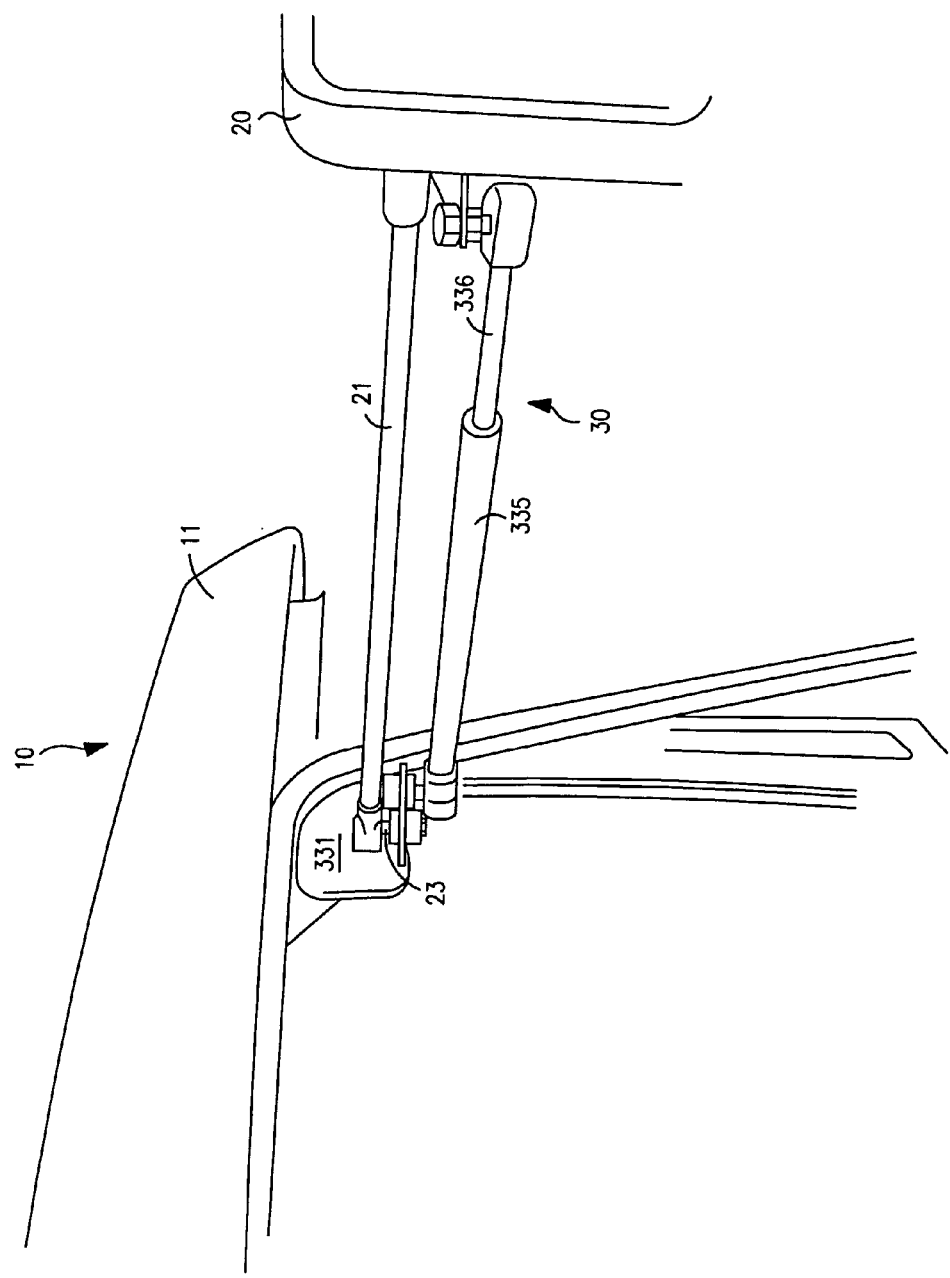
FIG. 6 is a perspective view of the upper door hinge assembly shown attached to the door and the vehicle.
Figure 7:
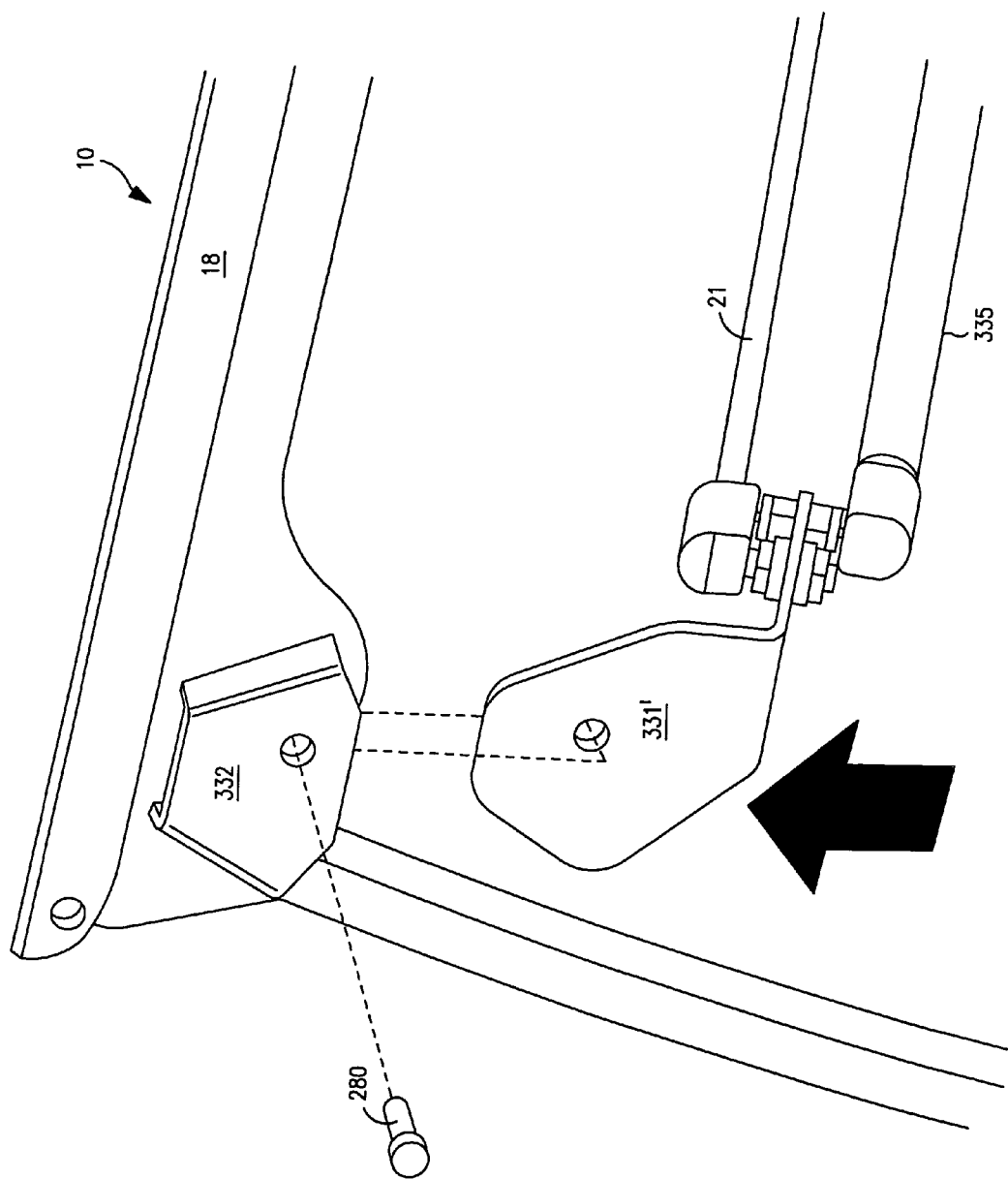
FIG. 7 is a perspective view of a mount for the upper door hinge assembly.

Turning now to FIGS. 5-7, embodiments of the door hinge assemblies are shown. In a first embodiment, an upper hinge assembly 30 includes a rigid member 21 such as a threaded rod (FIG. 6) or a metal strip (FIG. 5) having a first end pivotally attached to the door 20, and a second opposite end pivotally attached to the vehicle 10 via bracket 331. Each of the pivot points can be formed using any suitable means, such as a pin 23 arrangement as shown. FIG. 7 illustrates one embodiment for mounting the upper hinge assembly to the cart 10. The rigid member 21 and optional assist 335 are pivotally mounted to bracket 331' as shown. Bracket 331' is shaped to be received by receiving bracket 332 that is mounted to the cart 10. When bracket 331' is properly positioned in receiving bracket 332, holes in each align, allowing insertion of a bolt, pin or preferably a spring-loaded quick release pin 280 to removably secure the assembly to the cart.

Figure 7A:
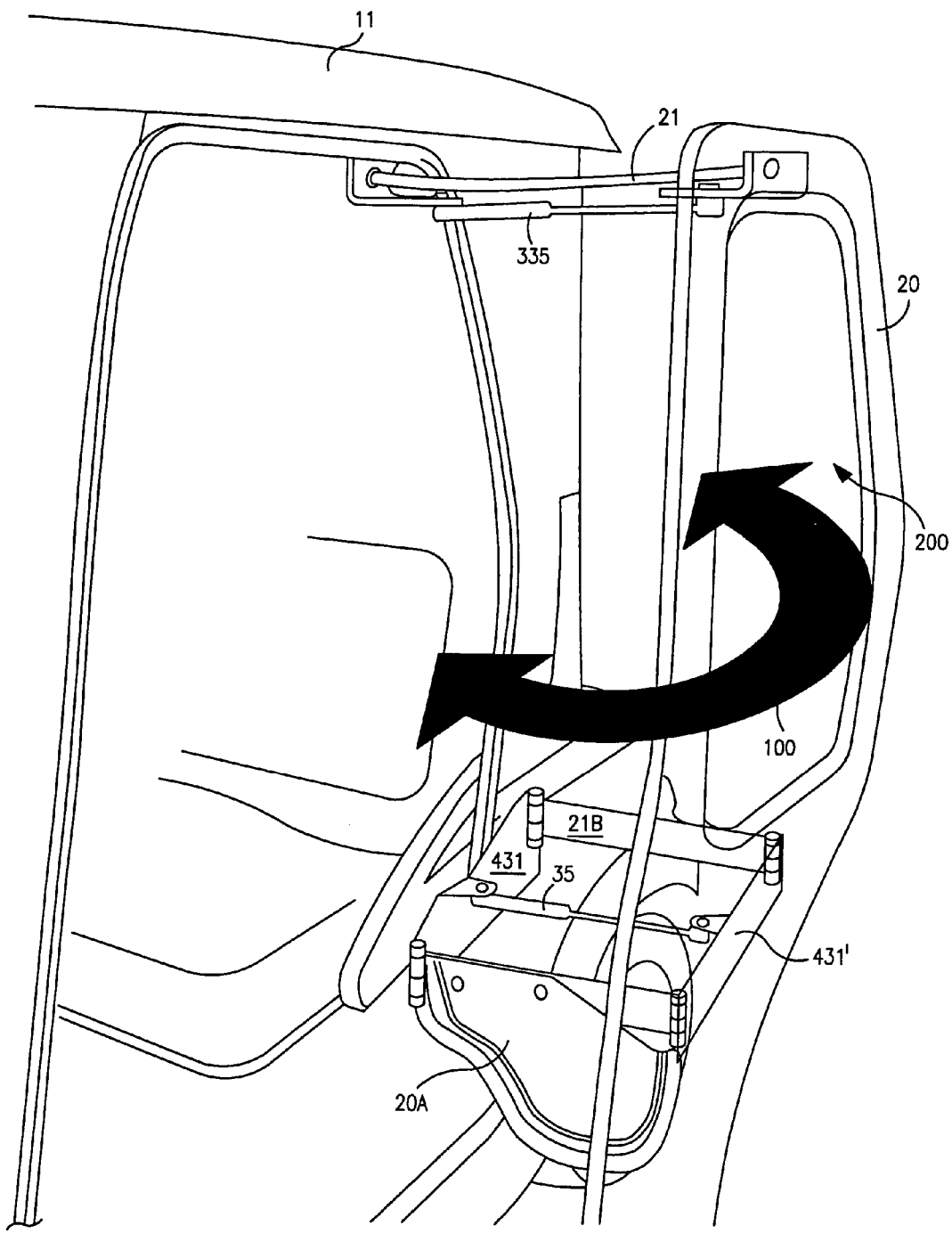
FIG. 7A is a perspective view of an alternative embodiment of the upper and lower door hinge assemblies.

FIG. 7A illustrates another embodiment of an upper hinge assembly. In this embodiment, the positioning of an L-shaped mounting bracket is located inside the vehicle as shown. In order to maintain clearance as the door swings from a closed position to an open position, the rigid member 21 is bent in the vicinity near the doorway, preferably at an angle of about 25°, so that the member 21 does not contact the vehicle as the door moves. An additional advantage of so mounting the upper hinge assembly is that most of the mechanism is hidden from outside view, particularly when the door is closed.

The upper hinge assembly 30 optionally also includes an assist 335, preferably a gas spring, compression of which causes energy to be stored in the device. The assist 335 is preferably mounted directly below (or above) the rigid member 21 (in the same vertical plane), but with offset pivot points located inwardly of the rigid member pivot points. Suitable pivot mounting configurations include eyelets and ball and socket configurations. When the door is positioned at the midpoint between the open and closed position (the position shown in FIG. 5), the assist 335 is in a neutral position. As the door swings past the midpoint position (either towards a closed position or an open position), the energy stored in the assist 335 is slowly released, causing the rod 336 of assist 335 to extend, which in turn assists in forcing the door to its closed or open position, as the case may be. When in the open or closed position, the extension of rod 336 results in the length of the assist 335 exceeding the length of rigid member 21. The assist 335 also helps maintain the door in the open or closed position. Preferably the assist 335 is dampened, so that the door decelerates as it closes.

Figure 5A:
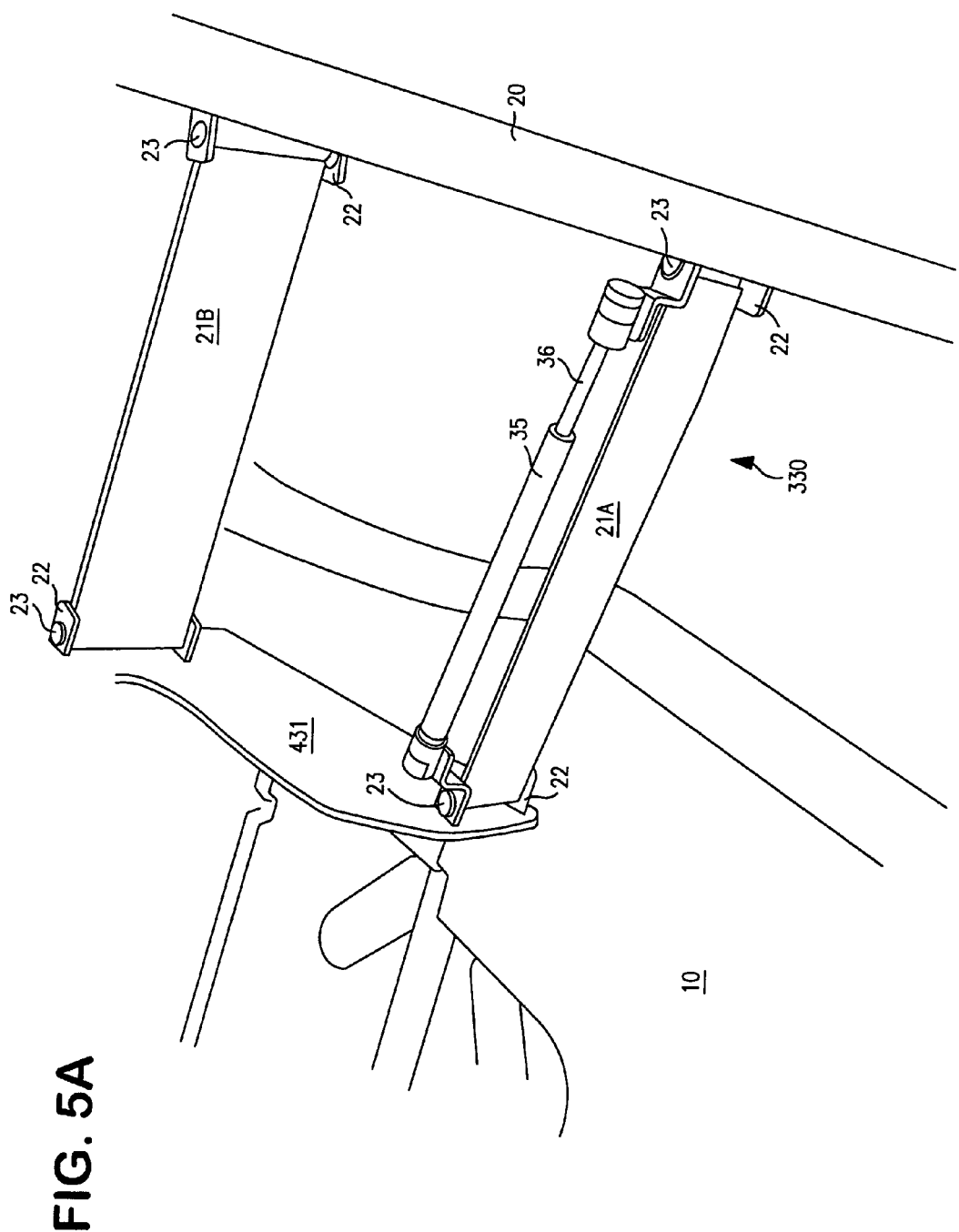
FIG. 5A is a perspective view of the lower hinge system in accordance with the present invention.

FIG. 5A illustrates lower hinge assembly 330, which includes a pair of spaced rigid members 21A, 21B, each having a first end pivotally attached to the door 20, and a second opposite end pivotally attached to the vehicle 10 via plate 431. Preferably the rigid members 21A and 21B are not horizontally aligned in order to ensure clearance during operation of the door 20. The rigid members 21A and 21B are of equal length, and are equal in length to rigid member 21 of upper hinge assembly 30, so that the door remains aligned with the frame. The rigid members 21, 21A and 21B are all preferably parallel. The particular length chosen for the rigid members depends upon the distance (the diameter of the semi-circle formed during the path of door travel) desired for the door to open/close, as discussed in greater detail below. Each of the pivot points can be formed using any suitable means, such as a C-bracket 22 and pin 23 arrangement as shown. Preferably at least one of the pin arrangements is adjustable, so that proper alignment of the door is ensured. The lower hinge assembly 330 also preferably includes an assist 35 to help open and close door 20, such as a gas spring, compression of which results in energy being stored in the device. In the embodiment shown, the assist 35 is mounted directly below (or above) the rigid member 21A (in the same vertical plane), but with pivot points located inwardly of the rigid member 21A pivot points. As with assist 335, when the door is positioned at the midpoint between the open and closed position, the assist 35 is in a neutral position. As the door swings past the midpoint position (either towards a closed position or an open position), the energy stored in the assist 35 is slowly released, causing the rod 36 of assist 35 to extend, which in turn assists in forcing the door to its closed or open position, as the case may be, and maintaining it in that state. The assist 35 can be dampened, so that the door decelerates as it closes. Those skilled in the art will appreciate that for optimal operation of the door, at least three rigid members 21 should be used. Although in the embodiment shown, there is one upper rigid member 21 and two lower rigid members 21A, 21B, the upper hinge assembly could include two or more rigid members. Similarly, the lower hinge assemble could include only one rigid member 21, or two or more. The three rigid members define three pivot locations offset from horizontal with respect to each other, and offset vertically from each other. Those skilled in the art will appreciate that more than three pivot locations could be used without departing from the spirit and scope of the invention.

Figure 5B:
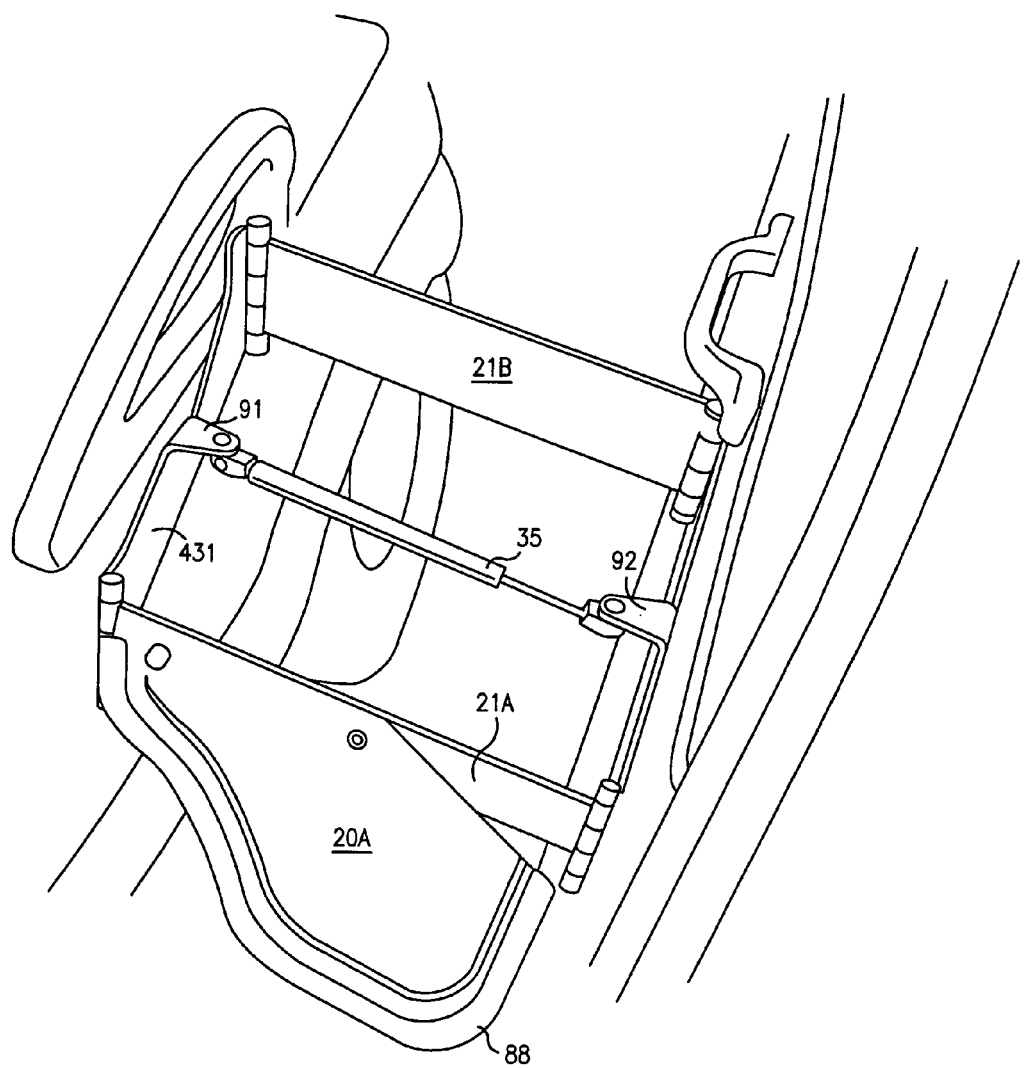
FIG. 5B is a perspective view of the lower hinge assembly in accordance with a second embodiment of the present invention.

FIG. 5B shows an alternative embodiment of the lower hinge assembly, where the assist 35 is located at or near the midpoint between the planes defined by the spaced rigid members 21A, 21B. That is, when the lower hinge assembly is in its maximum extended position (i.e., the door is positioned at the midpoint between the open and closed position and is at its farthest point away from the vehicle), the assist 35 is parallel to the rigid members and is located at or near the midpoint between their planes. Accordingly, movement of the rigid members in either direction will cause the assist 35 to expand, thereby assisting in the movement of the door 20. As in the other embodiment, the assist 35 is shorter in length than rigid members 21A, 21B and thus the opposite ends of assist 35 are fixed to flanges 91, 92 that are bent inwardly as shown in FIG. 5B. Rigid members 21A, 21B are hingedly connected to plate 431 that attaches to the vehicle, and opposite plate 431' that attaches to the door 20.

Figure 8:
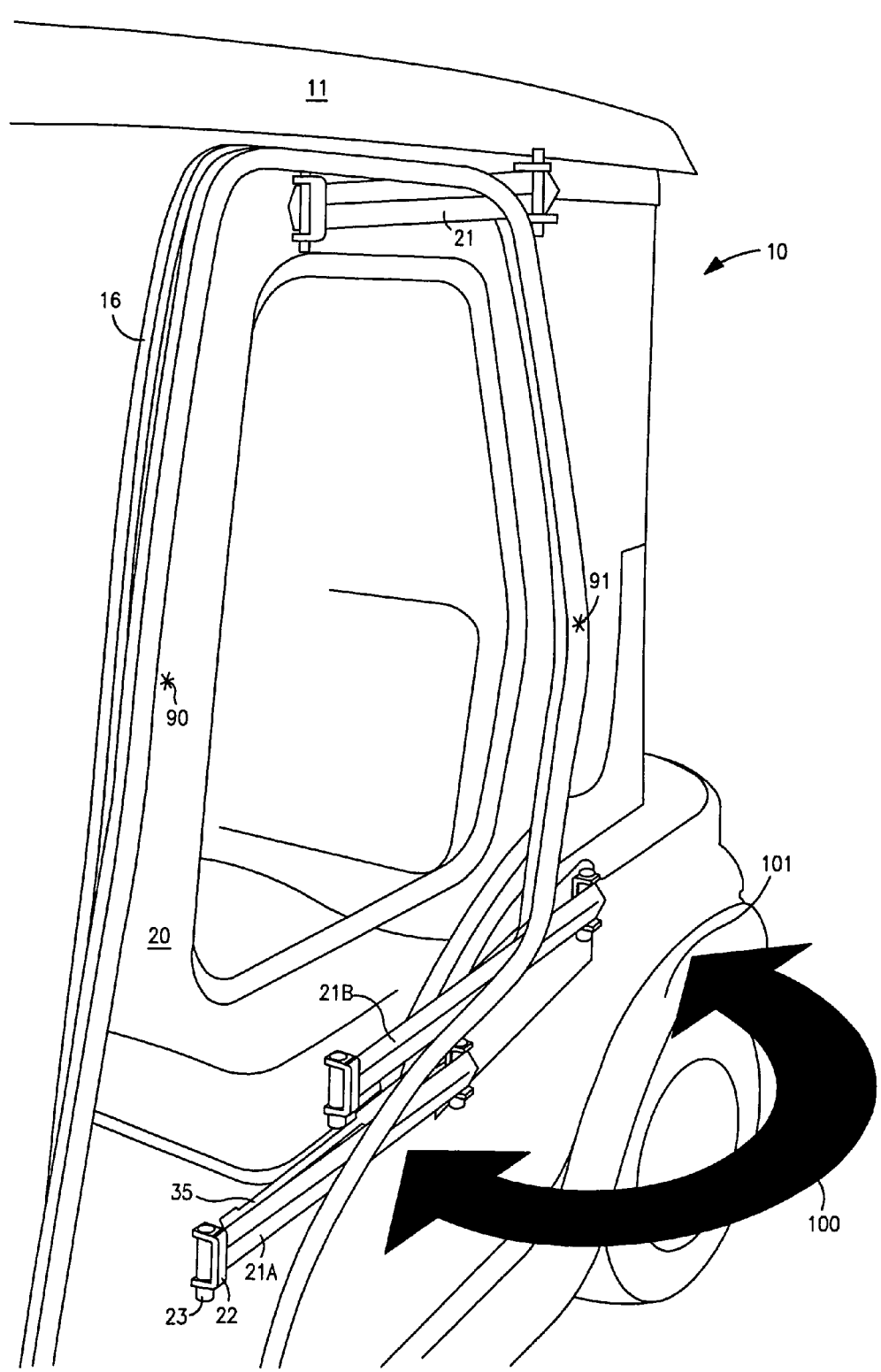
FIG. 8 is a perspective view of the door assembly shown in the closed position.
Figure 9:
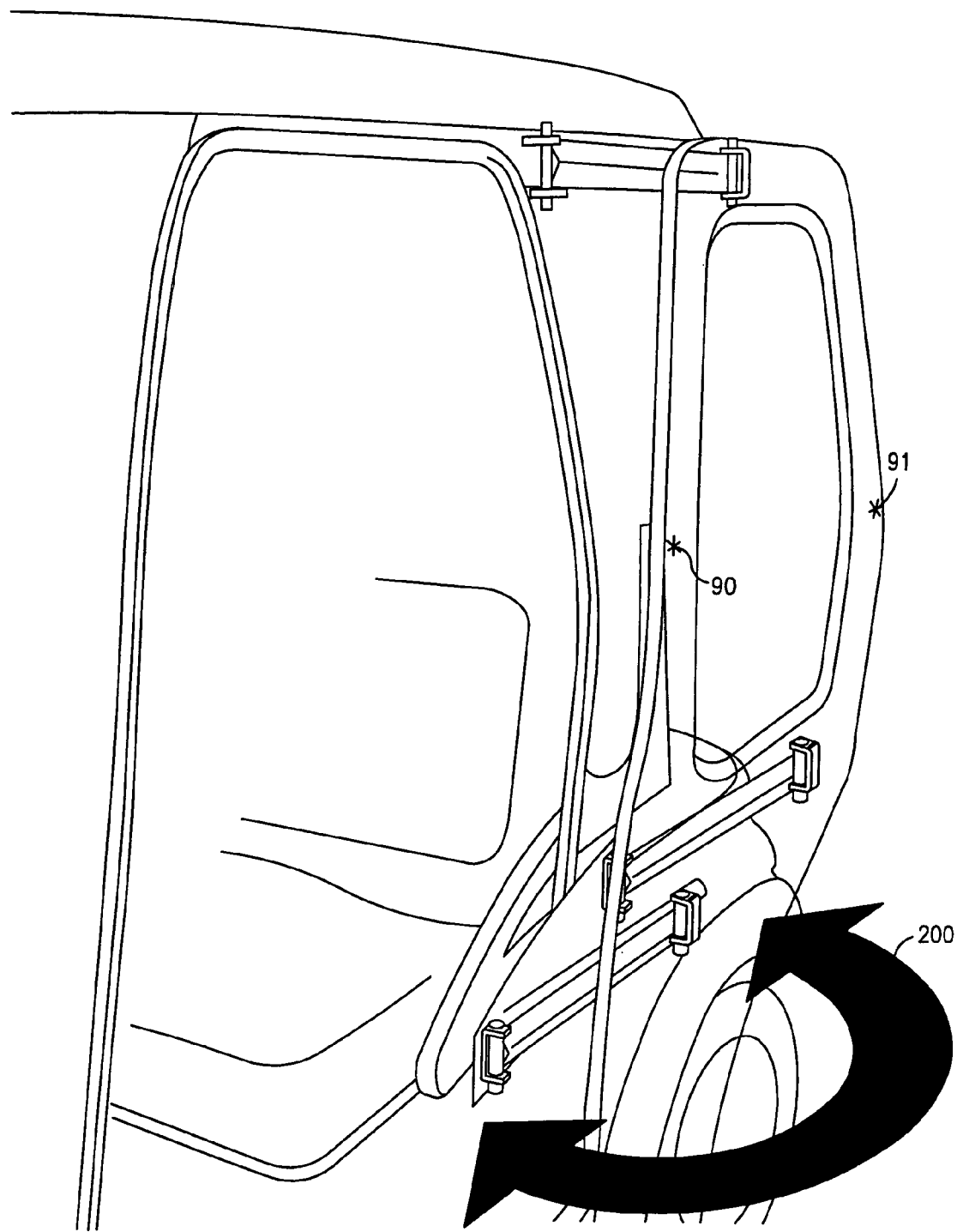
FIG. 9 is a perspective view of the door assembly shown in the open position.

Turning now to FIGS. 8 and 9, the motion of the door 20 from the closed state (FIG. 8) to the open state (FIG. 9) is shown. As the door is moved from the closed state to the open state (preferably manually), or from the open state to the closed state (preferably manually), its path of travel defines a semi-circle, as depicted by arrow 100 in FIGS. 8 and 9. The semi-circle so defined is of equal diameter regardless of the reference point of the door used. For example, the semi-circle defined by the path of travel of reference point 90 on the front surface of the door as shown in FIGS. 8 and 9 has the same diameter as the semi-circle defined by the path of travel of reference point 91 at the opposite marginal side on the front surface of the door 20, or for that matter, of any other reference point at any other place, on the same surface of the door. Similarly, the paths of travel of the rigid members 21, 21A and 21B also define semi-circles of equal diameters as viewed from reference points at the same relative position on each rigid member. As a result, opening and closing of the door 20 can be carried out even when the vehicle is in a confined space. Indeed, substantially less clearance is required than that of a door of identical size that is hinged at one end and swings outwardly, as the maximum distance the door 20 of the present invention moves outwardly from the vehicle is less than the maximum width of the door 20.

As seen in FIGS. 1 and 8, preferably the lower rearward side of the door 20 is arc-shaped, configured to match the contour of rear wheel fender 101 and leave the rear wheel 44 exposed. As a result, when the door is in the open position (FIGS. 2 and 9), it does not interfere with the operation of the real wheel 44, and creates an aesthetically pleasing appearance. As indicated above, the distance that the door 20 is designed to open is dictated by the length of the rigid members 21, 21A and 21B. Accordingly, this length preferably is chosen so that the lower arc-shaped portion of the door 20 aligns with the similarly shaped fender (or wheel well) of the vehicle when the door 20 is in the open, stored position.

In the event the contour of the lower rearward portion of the door results in a gap or space in the doorway even when the door is in the closed position, an auxiliary door panel 20A can be used to close or eliminate the gap as mentioned above. Preferably the auxiliary panel 20A is positioned between the door 20 and the vehicle, and a portion of it extends beyond the lower rearward contoured portion of the door when the door is in the closed position so that it is visible when the door is closed and blocks the gap that exposes the doorway that exists in view of the contoured configuration of the rearward lower portion of the door 20. Preferably the auxiliary panel 20A is secured to the forwardmost and lower rigid member 21A, as best seen in FIG. 5B. As the door is pivoted from its closed position to its open position, the auxiliary panel 20A follows the path of the rigid member 20A, pivoting about 180°, until it is sandwiched between the vehicle and the frontward portion of the door in the door open state, as shown in FIG. 1B. Preferably both the edges of the door and edges of the auxiliary panel include a gasket 88 to improve sealing against the vehicle.

Figure 10:
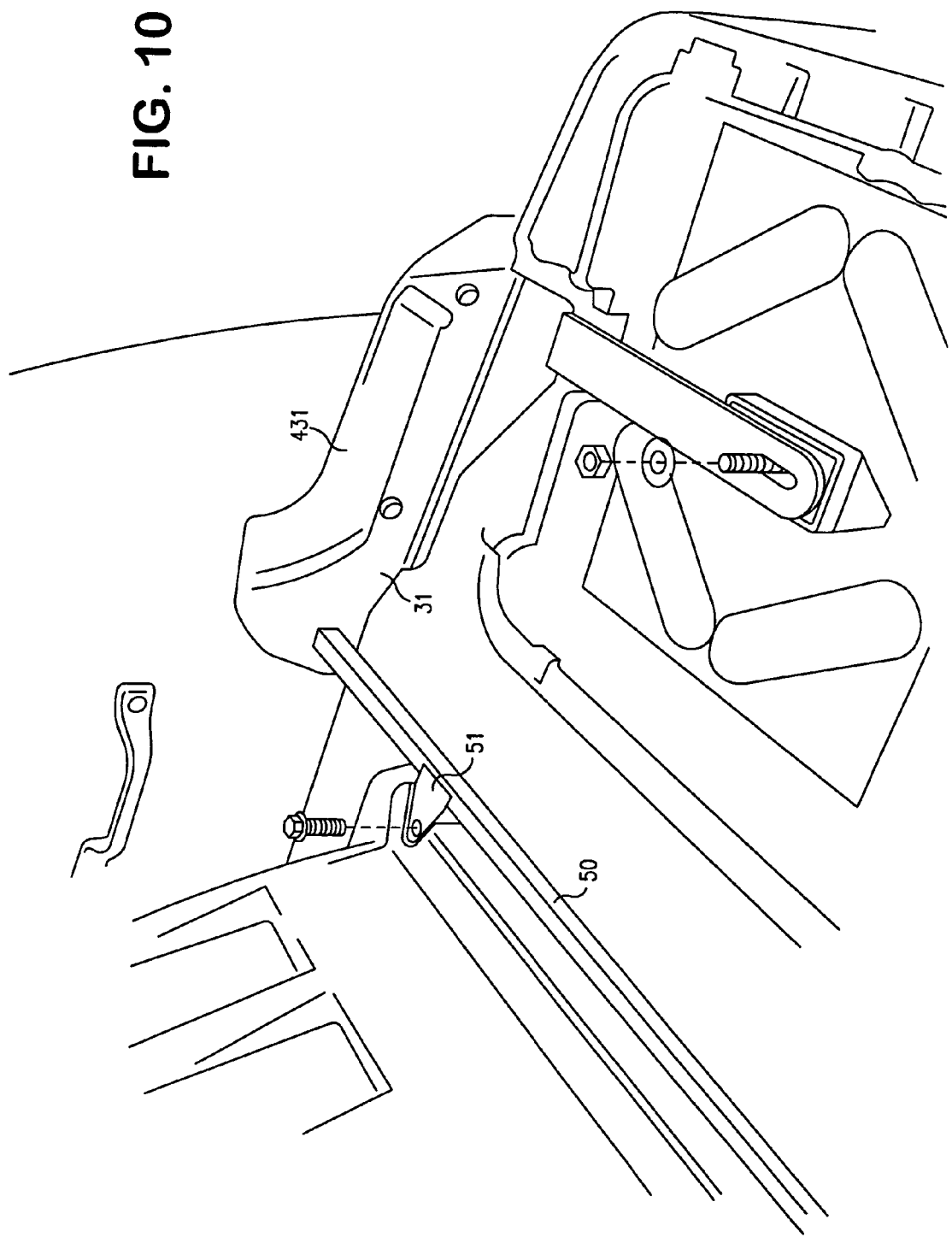
FIG. 10 is a perspective view of the plate assembly for removably engaging the door.

FIG. 10 illustrates a preferred design for securing the plates 31 in place. In this embodiment, the plate 31 on each side of the cart is affixed to a traversing rod 50. The rod 50 spans the width of the vehicle 10, and is secured to the vehicle by any suitable means. For example, the rod 50 can include a flange 51 that is bolted underneath the passenger seat, preferably at multiple locations to ensure it's stability.

Figure 11:
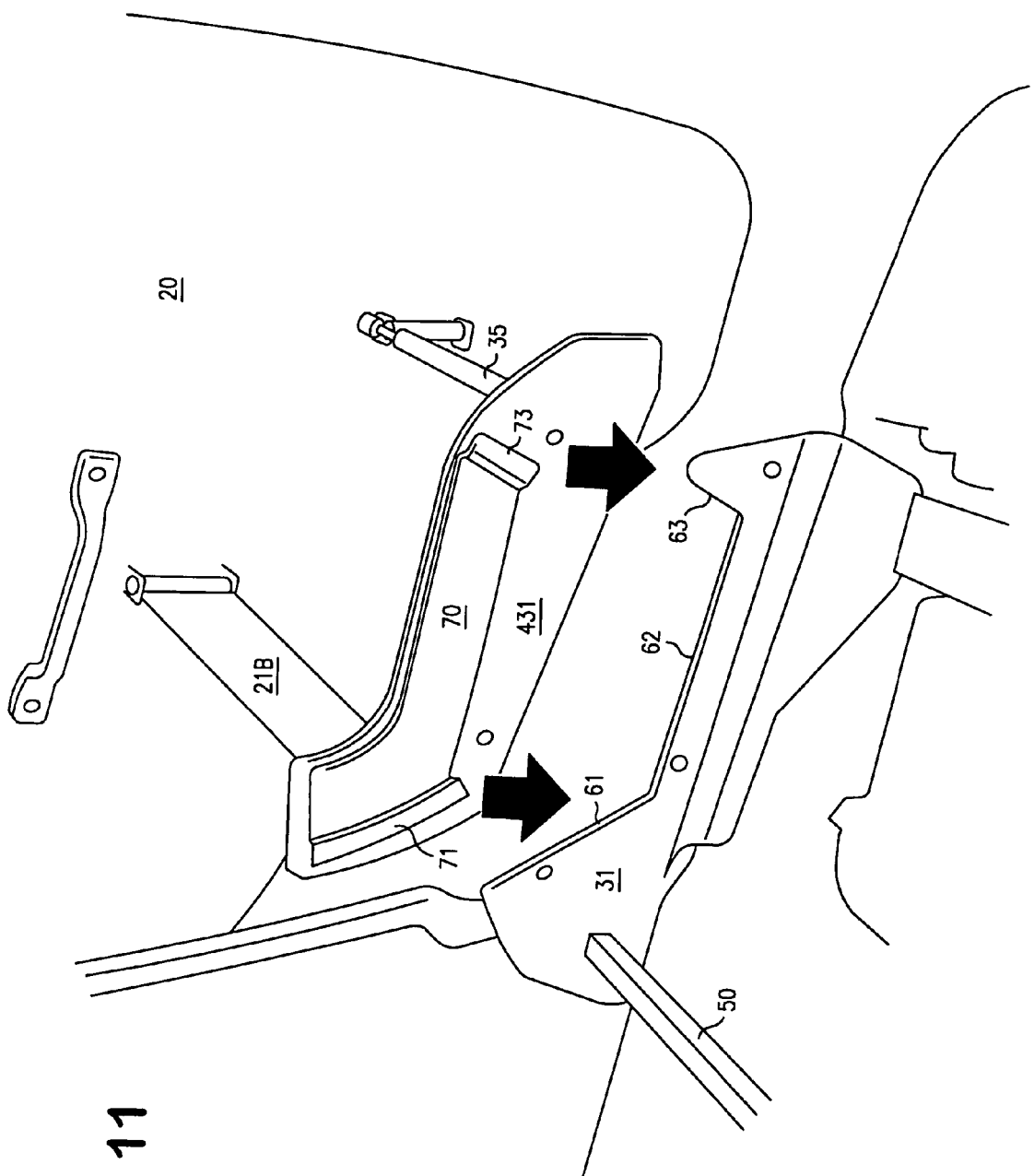
FIG. 11 is a perspective view showing the engagement of the plate assembly and the door.

As illustrated in FIG. 11, the door 20 is easily attached and removed from the vehicle using a self-aligning plate assembly. To that end, plate 31 has a trapezoidal shape, defined by downwardly sloped side 61, bottom 62 and upwardly sloped side 63. Plate 431 includes a bracket 70 secured thereto, such as by welding, the bracket 70 including a first bent flange 71 that with plate 431, is shaped and dimensioned to define a gap to slidingly engage side 61 of plate 31. Bracket 70 also includes a second bent flange 73 that together with plate 431, is shaped and dimensioned to define a gap to slidingly engage side 63 of plate 31. Accordingly, to mount the door 20 to the vehicle, the door 20 is positioned so that the bracket 70 is vertically positioned over plate 31 so that bent flange 71 is aligned over side 61, and bent flange 73 is aligned over side 63. The door 20 is then moved downwardly, in the direction of the arrows in FIG. 11, so that bracket 70 slidingly receives plate 31 and retains the door in place. In view of the trapezoidal shape of the plate 31 and bracket 70, the mating of the two is self-aligning. Quick-release pins can be used to further secure the plate 431 to the plate 31. Upper hinge assembly 30 is attached by sliding bracket 331' into receiver 332 (FIG. 7) and securing it in place with pin 280. Preferably the door mount is positioned so that the door, when properly mounted, is angled slightly outwardly, from top to bottom, at an angle of about 4°. This allows the door to close under the roof edge, and also provides additional room in the enclosed compartment.

To dismount the door 20, the quick-release pins are removed, and the door is lifted from the plate 31 and the upper hinge assembly 30 is removed from receiver 332.

Turning back to FIG. 1, there is shown front panels 80, 80'. The panels 80, 80' are preferably permanently installed, since they do not interfere with the ingress or egress from the passenger compartment, although the panels could be made to be removable if desired. Each panel is secured to a windshield support strut and to doorframe elongated member 116, and is preferably a molded piece made of plastic. The panels 80, 80' preferably include a transparent or translucent window made of acrylic, polycarbonate or glass to enhance passenger visibility. The edge of each panel abutting the closed door is preferably formed with a groove to receive the door edge when the door is in the closed state. Back panels 85 can be included to further enclose the passenger compartment. Preferably the back panels 85 are secured to the roof supports, roof and doorframe elongated member 115. The back panel is preferably curved in order to accommodate the contour of the vehicle as it transitions from the vehicle side to the vehicle rear. A rear curtain, such as a vinyl sheet, can be provided between the two back panels to complete the enclosure. The rear panel can be attached to the roof and/or roof supports by any suitable means, including a series of spaced snaps or with VELCRO. The rear curtain can be rolled up and stored at or near the roofline. Alternatively, a rigid rear curtain, similar to the back panels, can be used. A top header can be provided between the front and rear panels against which the top of the door seals in the closed position.

To further retain or lock the door 20 in its open and/or closed position, an optional manually operable latch can be used that attaches to the elongated member 116 in the door-closed state, and to elongated member 115 in the door-open state. Alternatively or in addition, magnets can be used to retain the door open or closed. In the embodiment where the vehicle is a golf cart, the door assembly of the present invention allows for quick and easy access into and egress from the passenger compartment of the golf cart, and also allows the golfer the option of riding with the door in the open position (such as once the weather has improved). Thus, one or more golfers enter the passenger compartment of the golf cart, close the aforementioned door or doors, drives the golf cart to a desired location on a golf course, such as the location of the golfer's golf ball, opens the door, exits the golf cart, strikes the ball, returns to the golf cart, and optionally closes the door. The golfer (or another passenger riding in the golf cart) may optionally close the door after the golfer exits the golf cart in order to help maintain the climate within the passenger compartment.

The doors, the front and rear panels and the rear curtain combine to enclose the passenger compartment in which the climate, particularly including the temperature but also potentially the humidity, can be further controlled such as with a heating unit that can be installed to supply heat to the compartment. For example, an overhead console can be installed in the compartment, such as by securing it to the existing roof. The unit can include a heating mechanism such as an electric heating element or black heat, and a variable speed fan, as well as multi-direction louvers to aim the airflow. The unit can be wired to the vehicle battery for power. The power supply can relay off the vehicle acceleration peddle so that the unit runs only when the peddle is depressed, thereby avoiding unnecessary battery drain. Cooling air also can be provided.

In view of the effective seal that is created when the door is closed (the perimeter of the door preferably includes a rubber gasket), and in view of the relatively small passenger compartment, the climate within the compartment can be maintained at an acceptable temperature or within an acceptable temperature range. In the case of a golf cart, despite the numerous openings and closings of the doors that are necessary to allow the golfer(s) to exit the vehicle, strike their ball and return to the vehicle, the temperature within the compartment nevertheless can be easily maintained within the desired range with the climate control system of the invention. For example, on a cold day, if heat is lost in the compartment upon opening one or both of the doors, it quickly can be returned to the desired temperature upon closing the doors and setting the heater to the appropriate temperature.

What is claimed is:

1. A method of mounting a door to a vehicle having a bumper and an existing roof, comprising:
   affixing a door frame to said existing roof and to said bumper, said door frame defining a doorway;
   mounting a door to said vehicle with a hinge assembly to provide a path of door travel from a door closed position where said door blocks said doorway to a door open position where said doorway is open, said path of travel being such that any two points on said door travel in semi circles of the same diameter, and wherein said door pivots at at least three locations offset horizontally and offset vertically from one another.

2. The method of claim 1, wherein said vehicle is a golf cart.

3. The method of claim 1, further comprising assisting said door to said open or closed position with a gas spring.

4. The method of claim 1, wherein said vehicle has an existing handle secured to said roof, and wherein said step of affixing said door frame to said existing roof comprises removing said handle and securing said door frame in its place.

5. The method of claim 1, wherein said hinge assembly comprises at least three rigid members each pivotally attached to said door and said vehicle, said at least three rigid members being parallel.

6. The method of claim 5, wherein the lengths of said three rigid members define the distance of travel of said door from said door open position to said door closed position.

7. The method of claim 1, wherein a door mounting plate is affixed to said vehicle, said door has a bracket affixed thereto and wherein said mounting step further comprises aligning said door on said vehicle by engaging said bracket with said door mounting plate.

8. The method of claim 7, wherein said bracket and plate have a trapezoidal shape.

9. The method of claim 7, wherein said door is removably engaged with said door mounting plate.

10. The method of claim 1, wherein said door pivots at at least three locations offset horizontally and offset vertically from one another.

11. The method of claim 1, wherein said hinge assembly is hidden from exterior view when said door is in said closed position.

12. A method of mounting a door to a vehicle having a chassis and an existing roof, comprising:
   affixing a door frame to said existing roof and to said chassis, said door frame defining a doorway;
   mounting a door to said vehicle with a hinge assembly to provide a path of door travel from a door closed position where said door blocks said doorway to a door open position where said doorway is open, said path of travel being such that any two points on said door travel in semi circles of the same diameter; and
   assisting said door to said open or closed position with a gas spring.

13. A method of mounting a door to a vehicle having a chassis and an existing roof, comprising:
   affixing a door frame to said existing roof and to said chassis, said door frame defining a doorway;
   mounting a door to said vehicle with a hinge assembly to provide a path of door travel from a door closed position where said door blocks said doorway to a door open position where said doorway is open, said path of travel being such that any two points on said door travel in semi circles of the same diameter;
   wherein said vehicle has an existing handle secured to said roof, and wherein said step of affixing said door frame to said existing roof comprises removing said handle and securing said door frame in its place.

14. A method of mounting a door to a vehicle having a chassis and an existing roof, comprising:
   affixing a door frame to said existing roof and to said chassis, said door frame defining a doorway;
   mounting a door to said vehicle with a hinge assembly to provide a path of door travel from a door closed position where said door blocks said doorway to a door open position where said doorway is open, said path of travel being such that any two points on said door travel in semi circles of the same diameter;
   wherein a door mounting plate is affixed to said vehicle, said door has a bracket affixed thereto and wherein said mounting step further comprises aligning said door on said vehicle by engaging said bracket with said door mounting plate.

15. The method of claim 14, wherein said bracket and plate have a trapezoidal shape.

* * * * *